US011859479B2

United States Patent
Molina Ortiz

(10) Patent No.: US 11,859,479 B2
(45) Date of Patent: Jan. 2, 2024

(54) COMPUTER IMPLEMENTED METHOD OF DETERMINING FRACTURE INTERFERENCE IN A HYDRAULICALLY FRACTURED WELL

(71) Applicant: ENOVATE CORP., Spring, TX (US)

(72) Inventor: Oscar Mauricio Molina Ortiz, Houston, TX (US)

(*) Notice: Subject to any disclaimer, the term of this patent is extended or adjusted under 35 U.S.C. 154(b) by 0 days.

(21) Appl. No.: 17/881,284

(22) Filed: Aug. 4, 2022

(65) Prior Publication Data
US 2022/0372856 A1 Nov. 24, 2022

Related U.S. Application Data

(63) Continuation-in-part of application No. 16/912,042, filed on Jun. 25, 2020, now Pat. No. 11,421,521, which is a continuation-in-part of application No. 16/789,150, filed on Feb. 12, 2020, now Pat. No. 11,308,409.

(51) Int. Cl.
   *E21B 43/17* (2006.01)
   *E21B 43/26* (2006.01)
   *E21B 21/08* (2006.01)

(52) U.S. Cl.
   CPC .............. *E21B 43/26* (2013.01); *E21B 21/08* (2013.01); *E21B 2200/20* (2020.05)

(58) Field of Classification Search
   CPC .................................. E21B 43/26; E21B 43/17
   See application file for complete search history.

(56) References Cited

U.S. PATENT DOCUMENTS

| 9,085,958 | B2 | 7/2015 | Laing et al. |
| 10,253,598 | B2 | 4/2019 | Crews et al. |
| 11,308,409 | B1* | 4/2022 | Molina Ortiz ........... G06N 5/02 |
| 11,421,521 | B1* | 8/2022 | Dontsova ................ E21B 44/02 |

OTHER PUBLICATIONS

Molina, Oscar M.; Analytical Model to Estimate the Fraction of Frac Hits in Multi-well Pads; Unconventional Resources Technology Conference; URTeC: 238; Jul. 22-24, 2019; pp. 1-24.

Molina, Oscar M.; Application of Pressure and Rate Transient Analyses to Stress-Sensitive Multi-Fractured Composite Systems and Compartmentalized Reservoirs; Louisiana State University; LSU Digital Commons; Jun. 2019; pp. 1-279.

Yadav, Himanshu and Siyavash Motealleh; Improving Quantitative Analysis of Frac-Hits and Refracs in Unconventional Plays Using RTA; Society of Petroleum Engineers; SPE-184812-MS; Jan. 24-26, 2017; pp. 1-14.

\* cited by examiner

*Primary Examiner* — Kenneth L Thompson
(74) *Attorney, Agent, or Firm* — Kearney, McWilliams & Davis, PLLC; Dileep Rao

(57) ABSTRACT

A method for quantifying frac hits within a few days using a novel pressure-transient analysis technique called differential pressure-transient analysis (DPTA). Unlike pressure transient analysis (PTA) methods, focused on single-well analyses, DPTA evaluates pressure response from two or more wells simultaneously to (1) determine the existence of frac hits, and (2) determine the magnitude of interference, defined as the ratio of inter-connected to total number of primary fractures from a given well. The output from (2) can be subsequently used to accurately predict oil and/or gas production rates for infill and offset wells.

10 Claims, 2 Drawing Sheets

COMPUTER IMPLEMENTED METHOD OF DETERMINING FRACTURE INTERFERENCE IN A HYDRAULICALLY FRACTURED WELL

CROSS REFERENCE TO RELATED APPLICATIONS

The current application is a Continuation in Part and claims priority to and the benefit of U.S. Nonprovisional patent application Ser. No. 16/912,042 filed on Jun. 25, 2020, titled "METHOD OF OPTIMIZING RATE OF PENETRATION," which is a Continuation in Part that claims priority to and the benefit of U.S. Nonprovisional patent application Ser. No. 16/789,150 filed on Feb. 12, 2020, titled "METHOD OF DETERMINING FRACTURE INTERFERENCE IN A HYDRAULICALLY FRACTURED WELL," which issued as U.S. Pat. No. 11,308,409 on Apr. 19, 2022. These references are hereby incorporated in their entireties.

FIELD

The present disclosure generally relates to a method of determining fracture interference in a hydraulically fractured well.

BACKGROUND

Hydraulic fracturing, often referred to as "fracking", is the technique used to profitably extract oil and gas from low and ultra-low permeability hydrocarbon-bearing rocks, such as tight sandstones, shales, and some coal beds. Hydraulic fracturing in these types of reservoirs typically involves injecting water, sand, and chemicals under high pressure into a horizontal section of a well to fracture the host rock at pre-determined locations, or stages, along the lateral run of the well. This process is intended to increase the area of contact between the well and reservoir as well as increase the size, extent, and connectivity of pre-existing fractures, both critical for the economic success of the well.

Many aspects of fracking can be enhanced to improve economic efficiency at each stage. While the present disclosure deals with a specific issue, the disclosed methods can be analogized and/or used in conjunction with other methods during the drilling, completion, evaluation, or production phases of a well in order to achieve optimal financial performance of a well.

To maximize hydrocarbons production, hence increasing economic efficiency from tight rocks, several horizontal wells are drilled and "fracked" in relatively close proximity. Such an arrangement of horizontal wells is often called a multi-well pad. Typically, new wells (i.e., infill, target, or child wells) are landed next to older, depleted wells (i.e., parent, existing, or offset wells).

When well spacing is too narrow, as is the current practice in the art, newly created fractures in a target (infill) well can interact undesirably with fractures from existing (offset) wells as the high-pressure treatment fluid in the infill well would tend to reach the low-pressure region around depleted existing wells. This can lead to lowered production of oil and/or gas.

The problem is a complex one, as many fractures exist from each well and degrees of interaction are difficult to determine or predict. Interaction between primary fractures are very different than interactions between secondary or tertiary fractures. The number of interactions, and degree of interference between wells will determine how much a target well can be affected by "frac hits".

The term "frac hits" refers to the propagation of hydraulic fractures from wells into other existing fractures, either primary or secondary, from neighboring wells. This fracture-driven interaction between the target and existing wells, depending on the magnitude of interference, may result in a temporary or permanent loss of productivity which ultimately hinders shale reservoir economics. In addition, because of the potentially high-pressure difference between wells, frac hits may induce blow-outs in existing wells and cause serious damage to both the sub-surface and surface infrastructure.

To avoid the negative impact that frac hits pose on reservoir economics and operational safety, a need exists to quantify and determine the degree of interference, in order to estimate the optimal well spacing for future infill wells in a given location. Such knowledge of the degree of interference caused by frac hits would also allow to carry out more accurate production forecasts accounting for the interaction between target and existing wells. Likewise, quantification of frac hits will yield an increased operational safety awareness during the fracturing process of other wells in the pad, because such frac hits analysis would help completion engineers improve their fracturing jobs design to avoid fracture-driven interactions. Previous methods have made use of rate transient analysis (RTA), which is the study of rate behavior over time. Given the long transient nature of flow rate in unconventional reservoirs, RTA methods usually require a long production history (typically >6 months) to assess the existence of frac hits and their impact on reservoir productivity.

The present disclosure provides a method for quantifying frac hits within a few days using a novel pressure-transient analysis technique called differential pressure-transient analysis (DPTA). Unlike pressure transient analysis (PTA) methods, focused on single-well analyses, DPTA evaluates pressure response from two or more wells simultaneously to (1) determine the existence of frac hits, and (2) determine the magnitude of interference, defined as the ratio of interconnected to total number of primary fractures from a given well. The output from (2) can be subsequently used to accurately predict oil and/or gas production rates for infill and offset wells.

BRIEF DESCRIPTION OF THE DRAWINGS

The detailed description will be better understood in conjunction with the accompanying drawings as follows.

Figure 1A:
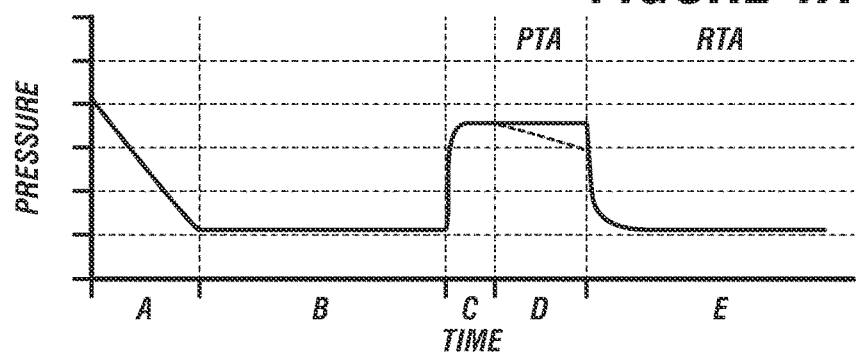
FIG. 1A shows pressure history at an existing well over time.

The embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge, or exemplary, procedural or other details supplementary to those set forth herein.

The embodiments of the present disclosure generally relate to a computer implemented method for quantifying frac hits and accurately predicting oil and/or gas production rates for hydraulically fractured wells impacted by frac hits.

The method of determining fracture interference in a hydraulically fractured well can have the steps of: providing a computer having a processor, a non-transitory data storage medium, and a transceiver, drilling a target well proximate to an existing well, fracturing the target well, flowing back the target well, measuring and collecting sensor data at the target well and the existing well, electronically communicating the sensor data to the compute, executing computer instructions stored within the non-transitory data storage medium instructing the processor to determine a degree of interference between the target well and the existing well, and transmitting the degree of interference to a display or a controller.

The computer can be any computer known to persons having ordinary skill in the art capable of processing information and providing a result. The computer can have one or more processors in physical or network communication with a non-transitory data storage medium and a transceiver.

The non-transitory data storage medium can be in physical or network communication with the processor and comprise computer instructions for instructing the processor to execute functions.

The non-transitory computer readable medium can be a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The transceiver can be any device capable of receiving and transmitting electronic communications. Exemplary communications include ethernet, wireless, Bluetooth, LoRaWAN, and the like.

The computer can transmit results to a display for action by a user, or directly to a controller to adjust well parameters.

The target well, for the purposes of this disclosure, is the well of interest being drilled and fractured and the degree of interference with existing wells is quantified to predict production rates at the target well. The magnitude of interference in the proposed DPTA method will directly be related to the number and quality of the fracture interactions.

Often a target well is drilled proximate an existing well. Spacing between wells can be five hundred feet, or even less, depending on the development plan, specific to the targeted reservoir, and available area for such development. When a well is fractured, primary fractures typically grow along the path of least resistance. When depleted or partially depleted wells exist nearby, the low-pressure areas surrounding the existing wells allow for the primary fractures to extend through them. As such, frac hits are almost inevitable during the fracturing process if nearby wells are heavily depleted.

Therefore, controlling fracture growth from the target well, and properly managing pressure at existing wells, are primordial to avoid fracture-driven interactions from a completion design standpoint. Even so, newly created hydraulic fractures can still interact with fractures from existing wells through primary fractures (hydraulic fractures extending from the target well all the way to another well or directly into existing hydraulic fractures from the existing well), or secondary fractures (hydraulic fractures interacting with pre-existing and/or induced fracture networks around existing wells).

After fracturing, the target well is flowed back, i.e., fracturing fluid is allowed to flow back to the surface in a controlled manner, after which oil and/or gas is produced at the well. While desirable to flow back at a constant rate, the method of the present disclosure can be applied when flowing at variable rates. Sensor readings are taken at the target well and the existing well and communicated to the computer. In embodiments, flow back rates can be controlled by executing computer instructions stored within the non-transitory data storage medium instructing the processor to output a signal to a controller.

In embodiments, the existing well can be shut-in, i.e., capped to temporarily cease to produce oil and/or gas while pressure builds up, to flow at a theoretical constant production rate of zero. The existing well can also be pressurized to a desired pressure, for example to attain pressures significantly close to the original virgin reservoir pressure. Persons having ordinary skill in the art can determine ideal pressures for existing wells in order to provide the best application of the method of the present disclosure to the target well. In embodiments, machine learning and artificial intelligence can be employed to allow the computer to determine and control ideal pressures for existing wells by executing computer instructions stored within the non-transitory data storage medium instructing the processor to output a signal to a controller.

A pressure differential between the target well and the existing well is calculated over a relatively short period of time by the processor by means of executing instructions stored in the non-transitory data storage medium. Various methods for determining pressure differential can be employed by persons having ordinary skill in the art to accomplish this task. The easiest method is to utilize direct readings from pressure transducers at each well. However, for example, knowing fluid density and flow rate or fluid velocity and wellbore design can result in the same data being calculated.

The latter method is known as surface-to-sandface conversion. Persons having ordinary skill in the art can make use of the available data to calculate the pressure differential between the target well and the existing well(s) in any known manner. Pressure calculations need not be accomplished in the same manner at the target well and the existing well(s).

Various sensors can be employed at the target well and existing well, such as to measure pressure, temperature, flow rate, fluid velocity, fluid density, and the like.

Upon compiling sensor data at the target well and the existing well. An algorithm can be applied to the pressure differential data to model the degree of interference between the wells, and therefore determine the effect on oil and/or gas production by executing computer instructions stored within the non-transitory data storage medium instructing the processor.

Each well is conceptualized as a tank. The frac hits are then modeled as a fluid connection between the tanks with a pipe fitting included. The pipe fitting can be any fitting that causes a pressure drop in fluid flow. Exemplary pipe fittings include valves, expanders, reducers, orifice plates, or any other fitting causing a pressure loss during fluid flow.

By modeling a pipe fitting and comparing the data to collected sensor data, a quantified degree of interference, and therefore an effect on well production, can be determined within twenty days or less. Under ideal conditions, i.e. fluid expansion in the wellbore is negligible, the target well is flowed at a constant rate, existing wells are pressurized and shut in, and accurate sensor data is available, a quantified degree of interference can be determined in under five days.

FIG. 1A shows a pressure profile at an existing well over time.

The existing well is producing oil and/or gas in time periods A and B. Pressure is gradually dropping during period A and has reached the design operating bottom hole flowing pressure at period B. The existing well is shut-in in period C, allowing the pressure to build up. In time period C, the well may also be actively pressurized, which is known as preventive pre-loading. Time period D should exhibit a constant pressure behavior, if the offset well is to remain shut-in. If fracture interference with a target well is present, pressure will decline during time period D as shown by the dashed line. If the well is put back on stream during D, pressure declines in a similar manner as in time period A. Time period D is when sensor measurements would be needed to apply the method of the present disclosure. In time period E, the well is placed back into service.

Figure 1B:
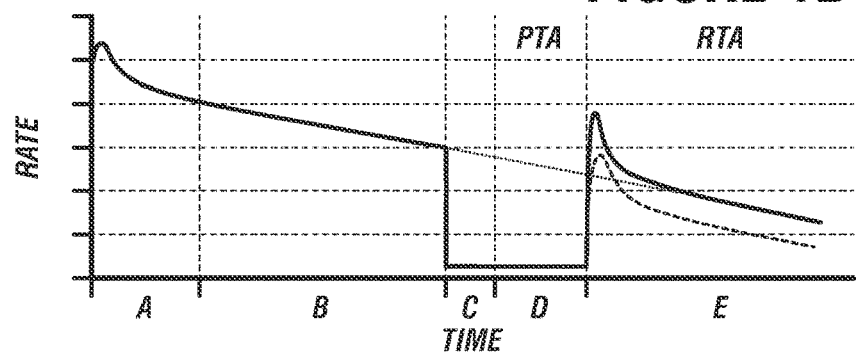
FIG. 1B shows flow rate history at an existing well over time.

FIG. 1B shows a flow rate profile at the existing well of FIG. 1A over time.

The flow rate of the existing well rapidly increases in time period A and a relatively sharp decline follows through time periods A and B. The existing well, in this example, is shut-in during time period C. In embodiments, the existing well can be actively pressurized, or preloaded at this time. In time period D, the existing well remains shut-in and does not produce oil and/or gas. The dotted line in time periods C and D show what the expected rate of production decline would have been had the well not been shut-in. In time period E, the well is placed back into service. The solid line shows the expected flow or production rate. However, if there if fracture interference with a nearby well, the rate may be as shown by the dashed line.

Figure 2A:
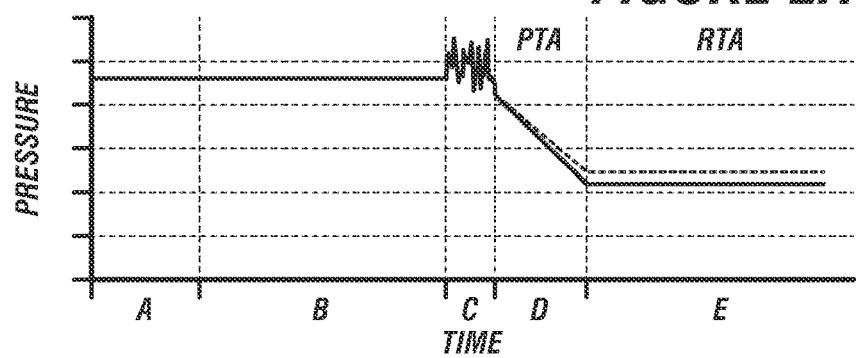
FIG. 2A shows pressure history at a target well over time.

FIG. 2A shows a pressure profile at a target well over time.

In this embodiment, after the existing well has been shut-in, the target well is fractured during time period C. The pressure fluctuates during the fracturing period which can induce some pressure changes in existing wells due to (1) stress shadowing effects (2) pressure communication through natural fractures, and/or (3) frac hits. Upon fracturing, the well can be flowed back at nearly constant rate during time period D. The expected pressure response is shown as a solid line. The pressure response shown as a dotted line represents the effect of fracture interference on pressure-transient behavior. This pressure difference, which can be positive or negative, is due to interference from the existing well. As the target well reaches its operating pressure in time period E, this pressure differential is still evident.

Figure 2B:
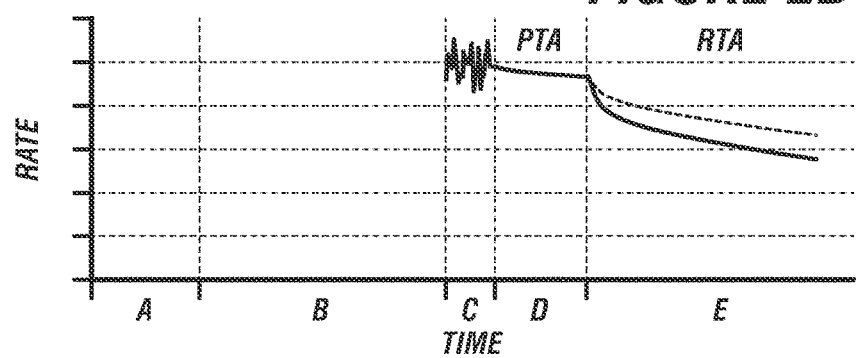
FIG. 2B shows flow rate history at a target well over time.

FIG. 2B depicts the rate history at the target well over time.

Variations in flow rate during time period C are intended to represent hydraulic fracturing operations at the target well. When fracturing the job is finished, the well can be flowed back at nearly constant rate during time period D. Time period E shows the expected flow rate as a solid line, and the effect of fracture interference on flow rate as a dashed line.

Figure 3:
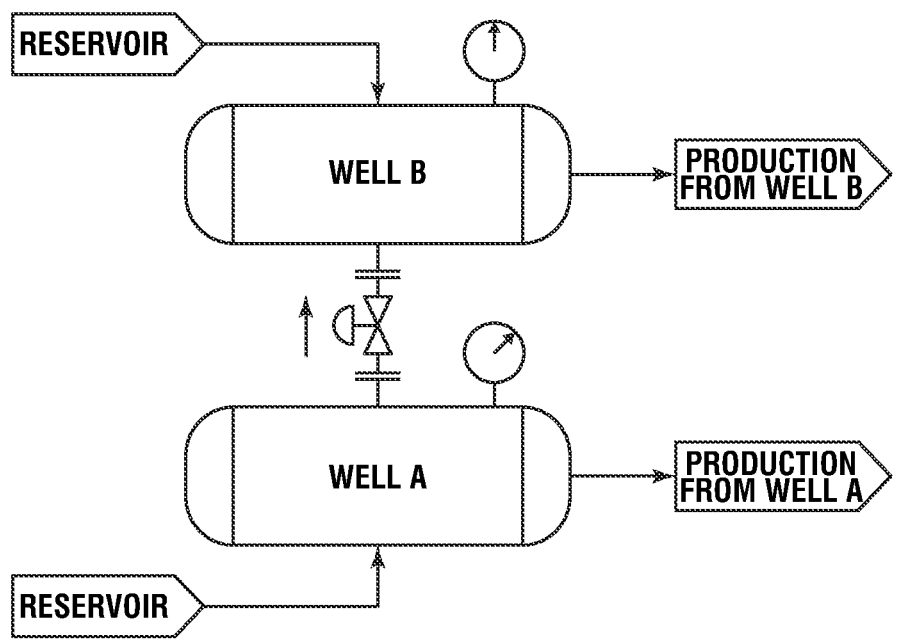
FIG. 3 illustrates the conceptualization of the method of the present disclosure.

FIG. 3 illustrates a model as applied by the method of the present disclosure.

Each well can be viewed as a tank with a fluid connection between. A valve is shown here as a pipe fitting. Depending on the degree of interference, pressure can bleed from (or to) Well A (existing well) to (or from) Well B (target well). The direction of flow leakage between wells is governed by the difference in their respective bottomhole pressure. For instance, Well A would see a gain in flow rate, or a delay in pressure decline, if this well is flowing at a higher rate than Well B, and vice versa. By taking sensor measurements and modeling valve aperture, the magnitude of interference can be properly estimated and production forecasts for each well can be adjusted accordingly.

Figure 4:
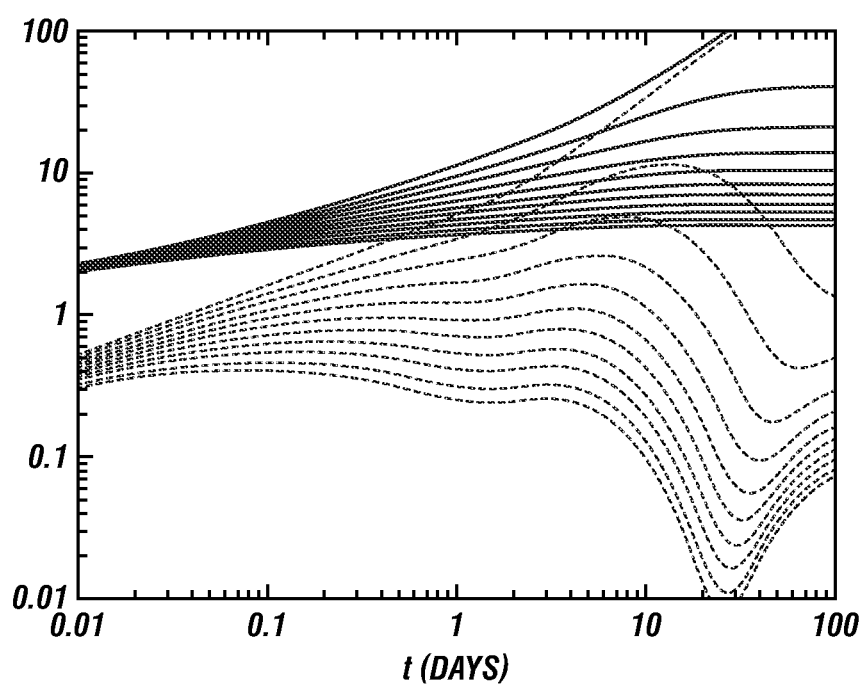
FIG. 4 illustrates an application of the method of the present disclosure.

FIG. 4 illustrates an application of the method of the present disclosure.

The set of solid curves represent the absolute difference in bottomhole pressure between Wells A and B divided by the sum of the individual flow rates. This parameter is referred to as rate-normalized pressure. The bottom set of curves show the logarithmic derivative of the rate-normalized pressure. Both set of curves are plotted for known degrees of interference.

By matching actual sensor readings to these curves, a degree of interference can be calculated. This allows for the analogous pipe fitting model to be constructed. By applying a novel method of analyzing the differential pressures at the target and existing wells, and as can be seen from the log-log pressure-transient diagnostic plot, the method of the present disclosure can reach a result in a few days of readings, as opposed to existing rate-transient methods that need hundreds of days of production data.

While the present disclosure emphasizes the presented embodiments and Figures, it should be understood that within the scope of the appended claims, the disclosure might be embodied other than as specifically enabled herein

What is claimed is:

1. A computer implemented method of determining fracture interference in a hydraulically fractured well, comprising:
   a. providing a computer having a processor, a non-transitory data storage medium, and a transceiver;
   b. drilling a target well proximate an existing well;
   c. fracturing the target well;
   d. flowing back the target well;
   e. measuring and collecting sensor data at the target well and the existing well;
   f. electronically communicating the sensor data to the computer;
   g. executing computer instructions stored within the non-transitory data storage medium instructing the processor to quantify a magnitude of interference between the target well and the existing well by applying an algorithm to the collected sensor data and modeling a quantitative pressure loss at the target well; and
   h. transmitting a value of the magnitude of interference to a display or a controller.

2. The method of claim 1, wherein the existing well is shut-in.

3. The method of claim 1, wherein the existing well is pressurized.

4. The method of claim 1, wherein the existing well is flowed at a constant flow rate.

5. The method of claim 1, wherein the existing well is flowed at a constant pressure.

6. The method of claim 1, wherein the target well is flowed back at a constant flow rate.

7. The method of claim 1, wherein the sensor data includes pressure, temperature, flow rate, fluid velocity, or fluid density.

8. The method of claim 1, wherein the controller, if present, adjusts operating parameters of the target well, the existing well, or both the target well and the existing well.

9. The method of claim 1, wherein the quantitative pressure loss is modeled by executing computer instructions stored within the non-transitory data storage medium instructing the processor to analogize a pipe fitting between the target well and the existing well.

10. The method of claim 9, wherein the pipe fitting is a valve, an expander, a reducer, or an orifice plate.

* * * * *